Figure 1:
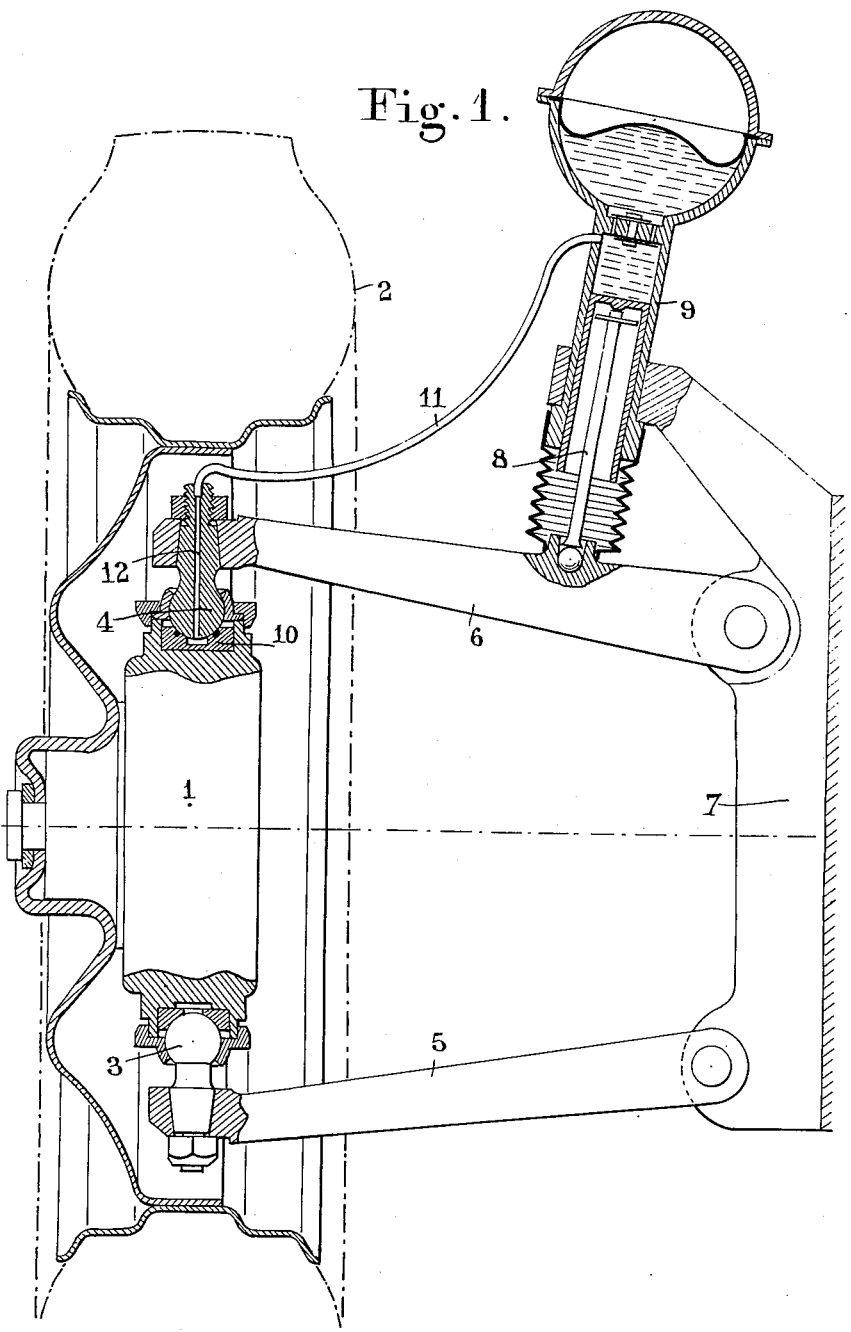

United States Patent Office 3,261,620
Patented July 19, 1966

3,261,620
BALL JOINT OF STEERING WHEELS OF A VEHICLE EQUIPPED WITH A HYDROPNEUMATIC SUSPENSION SYSTEM
Jean Cadiou, Paris, France, assignor to Societe Anonyme Andre Citroen, Paris, France
Filed June 9, 1964, Ser. No. 373,794
Claims priority, application France, June 10, 1963, 937,546, Patent 1,369,413
3 Claims. (Cl. 280—96.2)

This invention relates to steering linkage ball joints of vehicles equipped with a hydropneumatic suspension system and has a specific reference to a ball-joint mounting wherein the loads supported by the ball joint are balanced whatever the vehicle load may be.

It is known that in the case of a hydropneumatic suspension system the ball-joint load is proportional to the pressure developed in the suspension cylinder.

The present invention is concerned with the arrangement of at least one of the balls carried by the end of the suspension arm pivotally mounted on the frame and receiving the bearing point of the hydropneumatic suspension system in order to counter-balance the load supported by said ball irrespective of the vehicle load by means of a counter-pressure exerted from beneath on the bearing surface of the ball which engages the wheel stub axle; to this end, this ball has formed therethrough an axial duct constantly communicating with the cylinder of the hydropneumatic suspension system, and play is provided in the ball supporting member to permit the formation of an oil film; the diametral limitation of the film surface area between the ball-head and the ball-seat of the ball joint may be obtained by using for example a packing, more particularly an O-ring, fitting in a groove formed to this end in the aforesaid concave ball-seat.

Figure 2:
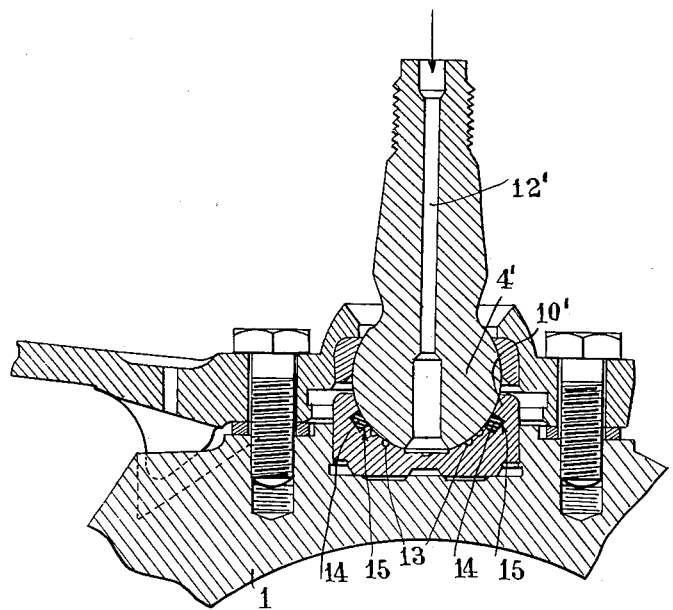

In order to afford a clearer understanding of this invention and of the manner in which the same may be carried out in practice, reference will now be made to the accompanying drawings illustrating diagrammatically by way of example a typical form of embodiment of the steering linkage ball-joint arrangement according to this invention. In the drawings:

FIGURE 1 is a part-sectional, part-elevational front view showing the hydropneumatic suspension elements of a steered or front wheel of a vehicle; and FIGURE 2 is an axial section showing on a larger scale a slightly modified ball-joint mounting.

The stub-axle 1 of the steered wheel 2 of the vehicle is carried by means of a pair of ball joints 3, 4 mounted on the outer ends of a pair of upper and lower wheel suspension arms or wishbones 5, 6 pivotally mounted on the frame 7 of the vehicle; the piston of the hydropneumatic suspension cylinder 9 secured on the frame 7 exerts through its rod 8 on the arm 5 a pressure directly proportional to the vehicle load. The liquid contained in the hydropneumatic cylinder is adapted to be directed by means of a flexible pipe line 11 and an axial hole 12 formed in the ball joint to the lower surface of the ball-head 4, between this head and the underlying concave ball-seat 10, as shown. Grooves 13 formed in the concave ball-seat 10 permit of properly distributing the oil film and this film is limited diametrally by the provision of an O-ring 14 fitting in a circular groove 15 formed in the concave ball-seat. The construction indicated by reference numerals 4', 10' and 12' in FIG. 2 corresponds to the construction indicated by reference numerals 4, 10 and 12, respectively, in FIG. 1, differing only in details of configuration.

With this arrangement the smoothness of operation is greatly improved and any wear and tear practically eliminated.

Of course, this specific form of embodiment is given by way of example only and should not be construed as limiting the present invention, since many modifications may be brought thereto without departing from the spirit and scope of the invention as set forth in the appended claims.

What I claim is:

1. Mounting for the steerable wheel of an automotive vehicle equipped with a hydropneumatic suspension system wherein the stub axle is carried by two ball joints disposed symmetrically above and beneath said stub-axle at the end of a pair of suspension arms pivotally mounted on the frame of the vehicle, one of said arms having pivoted thereon the piston of the hydropneumatic suspension system, which comprises at the outer end of said one arm connected to said suspension system a bearing ball of one of said ball joints through which a duct is formed, a flexible pipe line connecting said duct to said hydropneumatic suspension system, a ball support for said one joint rigid with said stub-axle and a gaged concave seat formed in said ball support, whereby the suspension fluid at the pressure prevailing in said hydropneumatic system is directed to said seat.

2. Mounting as set forth in claim 1, wherein a groove is formed along the peripheral contour of said ball supporting seat, at least one packing being fitted in said groove between said ball-joint and said ball support.

3. A mounting as set forth in claim 2, wherein said packing consists of an O-ring.

References Cited by the Examiner
UNITED STATES PATENTS

| | | | |
|---|---|---|---|
| 1,637,765 | 8/1927 | Comstock | 287—87 X |
| 1,916,251 | 7/1933 | Bijur | 280—96.1 X |
| 1,981,802 | 11/1934 | Gleason | 184—7 |
| 2,003,013 | 5/1935 | Siegrist | 184—7 |
| 2,043,229 | 6/1936 | Bijur | 184—7 |
| 2,045,027 | 6/1936 | Sanford | 267—64 |
| 2,421,691 | 6/1947 | Gibson | 287—87 |
| 2,715,454 | 8/1955 | Mueller et al. | 184—7 |
| 2,915,902 | 12/1959 | Brugger | 308—9 |
| 2,984,476 | 5/1961 | Turner | 267—35 |
| 2,985,444 | 5/1961 | Cadiou | 267—64 X |
| 3,074,736 | 1/1963 | Krizman | 287—90 X |
| 3,155,406 | 11/1964 | Gottschald | 287—87 |

KENNETH H. BETTS, *Primary Examiner.*